(12) United States Patent
Nasukawa et al.

(10) Patent No.: US 8,364,485 B2
(45) Date of Patent: Jan. 29, 2013

(54) METHOD FOR AUTOMATICALLY IDENTIFYING SENTENCE BOUNDARIES IN NOISY CONVERSATIONAL DATA

(75) Inventors: Tetsuya Nasukawa, Kanagawa-ken (JP); Diwakar Punjani, Sahibabad (IN); Shourya Roy, New Delhi (IN); L. Venkata Subramaniam, Gurgaon (IN); Hironori Takeuchi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1144 days.

(21) Appl. No.: 11/845,462

(22) Filed: Aug. 27, 2007

(65) Prior Publication Data

US 2009/0063150 A1 Mar. 5, 2009

(51) Int. Cl.
 *G10L 15/04* (2006.01)
(52) U.S. Cl. ........ 704/253; 715/259; 715/243; 715/272; 704/9; 704/4; 704/235; 704/10; 379/75; 379/168; 707/999.003; 707/999.007
(58) Field of Classification Search .................. 704/235, 704/9, 4, 253, 10; 379/168, 75; 707/999.003; 715/259, 246
See application file for complete search history.

(56) References Cited

U.S. PATENT DOCUMENTS

| | | | | |
|---|---|---|---|---|
| 5,806,021 | A * | 9/1998 | Chen et al. ........................ | 704/9 |
| 5,918,240 | A * | 6/1999 | Kupiec et al. ................... | 715/243 |
| 6,473,754 | B1 * | 10/2002 | Matsubayashi et al. .............. | 1/1 |
| 6,549,614 | B1 * | 4/2003 | Zebryk et al. .................... | 379/75 |
| 6,879,951 | B1 * | 4/2005 | Kuo .................. | 704/10 |
| 6,928,407 | B2 * | 8/2005 | Ponceleon et al. ............ | 704/253 |
| 2001/0009009 | A1 * | 7/2001 | Iizuka ........................... | 707/539 |
| 2002/0032564 | A1 * | 3/2002 | Ehsani et al. .................. | 704/235 |
| 2002/0178002 | A1 * | 11/2002 | Boguraev et al. ............. | 704/235 |
| 2003/0212541 | A1 * | 11/2003 | Kinder .............................. | 704/4 |
| 2005/0086048 | A1 * | 4/2005 | Nakayama ........................ | 704/4 |
| 2007/0071206 | A1 * | 3/2007 | Gainsboro et al. ............ | 379/168 |

OTHER PUBLICATIONS

The Second Workshop on Building Educational Applications Using NLP, Proceedings of the Workshop, Jun. 29, 2005, copyright 2005 The Association for Computational Linguistics, pp. 1-93.
Language Identification and Language Specific Letter-to-Sound Rules, Lewis et al.
Comparing and Combining Generative and Posterior Probability Models: Some Advances in Sentence Boundary Detection in Speech, Liu et al.
Using Maximum Entropy for Text Classification, Nigam et al.
Adding Sentence Boundaries to Conversational Speech Transcriptions using Noisily Labelled Examples, Nasukawa et al., AND 2007, pp. 71-78.

* cited by examiner

*Primary Examiner* — Michael Colucci
(74) *Attorney, Agent, or Firm* — Cantor Colburn LLP

(57) ABSTRACT

Sentence boundaries in noisy conversational transcription data are automatically identified. Noise and transcription symbols are removed, and a training set is formed with sentence boundaries marked based on long silences or on manual markings in the transcribed data. Frequencies of head and tail n-grams that occur at the beginning and ending of sentences are determined from the training set. N-grams that occur a significant number of times in the middle of sentences in relation to their occurrences at the beginning or ending of sentences are filtered out. A boundary is marked before every head n-gram and after every tail n-gram occurring in the conversational data and remaining after filtering. Turns are identified. A boundary is marked after each turn, unless the turn ends with an impermissible tail word or is an incomplete turn. The marked boundaries in the conversational data identify sentence boundaries.

4 Claims, 1 Drawing Sheet

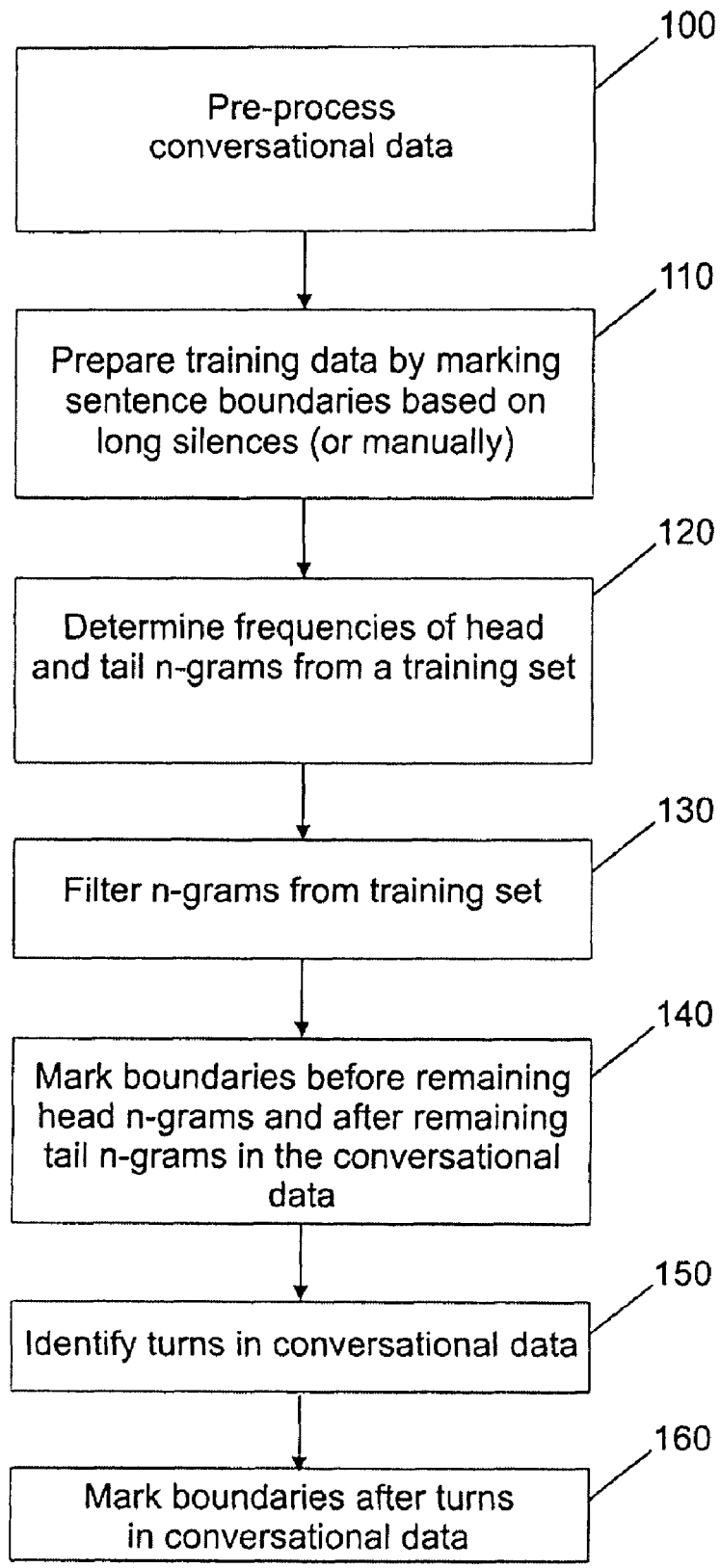

METHOD FOR AUTOMATICALLY IDENTIFYING SENTENCE BOUNDARIES IN NOISY CONVERSATIONAL DATA

BACKGROUND

The present invention relates generally to speech recognition, and, more particularly, to automatic identification of sentence boundaries.

Automatic Speech Recognition (ASR) has proven useful for a number of applications. Typically, the output of an ASR system is a stream of words, in particular in outputting text corresponding to audio files. Generally, automatic transcriptions, and sometimes manual transcriptions, of conversations do not contain any punctuation that indicates sentence boundaries. Also, punctuations in manual transcriptions are not put inserted in a consistent manner. However, many applications, such as information retrieval and natural language processing benefit from (or even require) a sentence structure. State of the art Natural Language Processing (NLP) tools, such as Parts of Speech (POS) taggers and syntactic parsers, require input to be a single sentence. Application of such NLP tools to textual data based on ASR output ends up with significant errors.

The inherent word recognition error of an ASR system and the presence of noise, such as repetitions, false starts, and filler words in conversational speech, make identifying structural information a more challenging task as compared to well-written text.

SUMMARY

According to an exemplary embodiment, a method for automatically identifying sentence boundaries in noisy conversational transcribed data is provided. Sentence boundaries in noisy conversational data are automatically identified. Noise and transcriptions symbols are removed from the transcribe data. An initial set of boundaries is marked in an automatic speech recognition output based on silence durations. Long silences are assumed to mark sentence boundaries. This marked output forms the training set. Alternately, the training set can also comprise manual transcriptions with sentence boundaries marked. Frequencies of head and tail n-grams that occur at the beginning and ending of sentences are determined from the training set, and n-grams that occur a significant number of times in the middle of sentences in relation to the frequencies at which they occur at the beginning or sending of sentences are filtered out. A boundary is marked in the conversational data test before every head n-gram and after every tail n-gram that occurs in the conversational data and is also remaining in the training set after filtering. Turns are identified in the conversational data, indicating a speaker change. A boundary is marked after each turn in the conversational data, unless the turn ends with an impermissible tail word or includes a word indicating an incomplete turn. The marked boundaries in the conversational data identify sentence boundaries.

BRIEF DESCRIPTION OF THE DRAWING

FIG. 1 illustrates a method for automatically identifying sentence boundaries in noisy conversational data according to an exemplary embodiment.

DETAILED DESCRIPTION

ASR output does not contain punctuations. However, some of the sentence boundaries in the textual data of ASR output may be identified by assuming that a sufficiently long silence indicates a sentence boundary. It may be further assumed that a sufficiently long silence, e.g., >0.7 seconds, follows an end of a sentence and is followed by a head of a sentence.

In ASR transcribed data, the presence of a pause or silence in conversation may be an indication of a sentence boundary. However, due to the presence of spontaneity, hesitation, repetition, interruption in conversation and other factors, boundaries marked using only silence information are not entirely accurate. Using silence as an indication of sentence boundaries may result in the marking of false boundaries and may result in missed boundaries, because people may not pause appropriately between sentences. However, it is possible to build a language model from a test set/training set with boundaries noisily marked using silence information and then use the language model to remove false boundaries and add the boundaries missed by the silence model.

According to an exemplary embodiment, if data has already been manually transcribed, punctuations, such as periods, already present may be used to generate n-gram models of head and tail words.

While grammar based language models are easy to understand, they are not generally useful for large vocabulary applications, simply because it is so difficult to write a grammar based language model with sufficient coverage of the language. The most common kind of language model in use today is based on estimates of word string probabilities from large collections of text or transcribed speech. In order to make these estimates trackable, the probability of a word given the preceding sequence is approximated to the probability given the preceding one (bigram) or two (trigram) words (in general, these are called n-gram models).

According to exemplary embodiment, boundary detection uses head phrase and tail phrases. Silence information is used to identify sentence boundaries to form test data/training data as described above, and then probable head and tail phrases are learned and used to mark sentence boundaries in the test/training data. Phrases that occur at the beginning or end of a sentence are referred to as a head or a tail phrase, respectively. Some phrases are more likely to be head or tail phrase than others. For example, phrases such as "hello, this is", "Would you like", etc. may be assumed to occur at the beginning of a sentence, whereas phrases such as "help you today", "click on OK", etc. may commonly be found at the end of the sentence.

Based on these assumptions, n-gram models of expressions (and their frequencies) may be generated for heads of sentences and ends of sentences. This model may then be then applied on test data/training data to identify sentence boundaries.

As those skilled in the art will appreciate, an n-gram is a sub-sequence of n items from a given sequence. The items in question can be letters, words or base pairs according to the application. An n-gram model models sequences, notably natural languages, using the statistical properties of n-grams. When used for language modeling independence assumptions are made so that each word depends only on the last n words. This assumption is important because it massively simplifies the problem of learning the language model from data. In addition, because of the open nature of language, it is common to group words unknown to the language model together.

FIG. 1 illustrates an exemplary method for identifying sentence boundaries in noisy conversational data. According to exemplary embodiments, boundary detection begins with data cleansing, i.e., pre-processing the conversational data at step 110. In this preprocessing step, transcription symbols and noise introduced in conversational data are removed. In the presence of such noise, some head and tail phrases may appear corrupted, reducing the statistical significance of the phrases.

Next, at step 120, training/test data is prepared by marking sentence boundaries based on long silences. A long silence is assumed to indicate a sentence boundary. Alternately, if manual transcriptions are available with sentence boundary information that has been marked by the transcriber, the manually marked transcription can be used as the training data.

Next, head and tail phrases are identified, along with the frequencies of their occurrence, at step 130. According to an exemplary embodiment, a pass is made over the test/training data annotated with boundaries based on silence information as explained above. Head and tail phrases or "n-grams" are identified, along with their frequencies. For example, any phrase of length k that appears at the beginning or end of a sentence may be selected as the head phrase or the tail phrase, respectively. The value of k may be set depending on the data set.

At step 140, this list of phrases is "pruned" or filtered using thresholds. For example, a frequency threshold may be set such that the frequency of occurrence of each phrase must be greater than the threshold to consider it a head phrase or a tail phrase. Also, phrases that often appear at the beginning or end of a sentence and also in the middle of a sentence are removed based on the ratio of occurrences of the phrase at the beginning or end of a sentence to the total number of occurrences. If the ratio is close to one, the phrase is considered a head or tail phrase or "n-gram". As people often do not finish their sentences, the list of tail phrases may be pruned more significantly. Finally, to combat the noise introduced by ASR, the list of head and tail phrases may be pruned based on impermissible head words and tail words, e.g., conjunctions, prepositions, etc.

After the head and tail phrases are identified and "filtered" as described above, sentence boundaries are inserted into the conversational data based on the remaining n-grams in the test set at step 150. The head and tail phrases are used for annotating the transcript, i.e., the conversational data. A boundary is marked before every head phrase and after every tail phrase. Next, "turns" indicating speaker changes in the transcript are identified at step 160. Each "turn" may be treated as an end of a sentence unless the turn ends with an impermissible tail word. Interruption and continuation across turns may be handled separately. Thus, words indicating incomplete turns, e.g., get, and, etc, may not be treated as sentences. Boundaries are inserted after turns in the conversational data at step 170.

If any false boundaries that have been inserted, i.e., boundaries that should not have been inserted based on the ratio of occurrences of head/tail phrases to the total number of occurrences and the impermissible head/tail words, they may be removed during a second pass through the transcript.

According to exemplary embodiments, a technique for identifying boundaries in noisy speech is provided without requiring supervision, so there is no need to create heuristic rules. The technique is data driven, i.e., the most suitable rules for each data set are automatically generated. Identifying sentence boundaries in transcriptions of noisy conversational data may be done automatically. Also, no manually labeled training data is required. Training data may be automatically annotated (marked with boundaries) based on silence/pause information.

Exemplary embodiments described above may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for automatically identifying sentence boundaries in noisy conversational transcription data, comprising:
   pre-processing on a computing device the noisy conversational transcription data to remove transcription symbols and noise to produce processed transcription data;
   marking with the computing device sentence boundaries in the processed transcription data based on manually marked sentence boundaries in the processed transcription data, wherein said marked transcription data forms a training set;
   determining frequencies of head and tail n-grams that occur at the beginning and ending of sentences in the training set;
   determining the frequencies that the head and tail n-grams occur in the middle of sentences;
   filtering out from the training set n-grams that occur a significant number of times in the middle of sentences in relation to the frequencies at which the n-gram occur at the beginning or ending of sentences;
   marking a boundary in the conversational data before every head n-gram and after every tail n-gram that occurs in the conversational data and that also remains in the training set after filtering;
   identifying turns occurring in the conversational data indicating a speaker change in the conversational data; and
   marking a boundary in the conversational data after each turn, unless the turn ends with an impermissible tail word or includes a word indicating an incomplete turn;
   wherein the steps of marking identify sentence boundaries in the conversational data.

2. The method of claim 1, further comprising removing false boundaries from the conversational data.

3. The method of claim 1, wherein the step of filtering includes using a threshold ratio of occurrences of head and tail n-grams to n-grams occurring in the middle of sentences in the training set.

4. The method of claim 1, wherein the step of filtering includes removing impermissible head or tail n-grams.

\* \* \* \* \*